United States Patent Office 2,939,179
Patented June 7, 1960

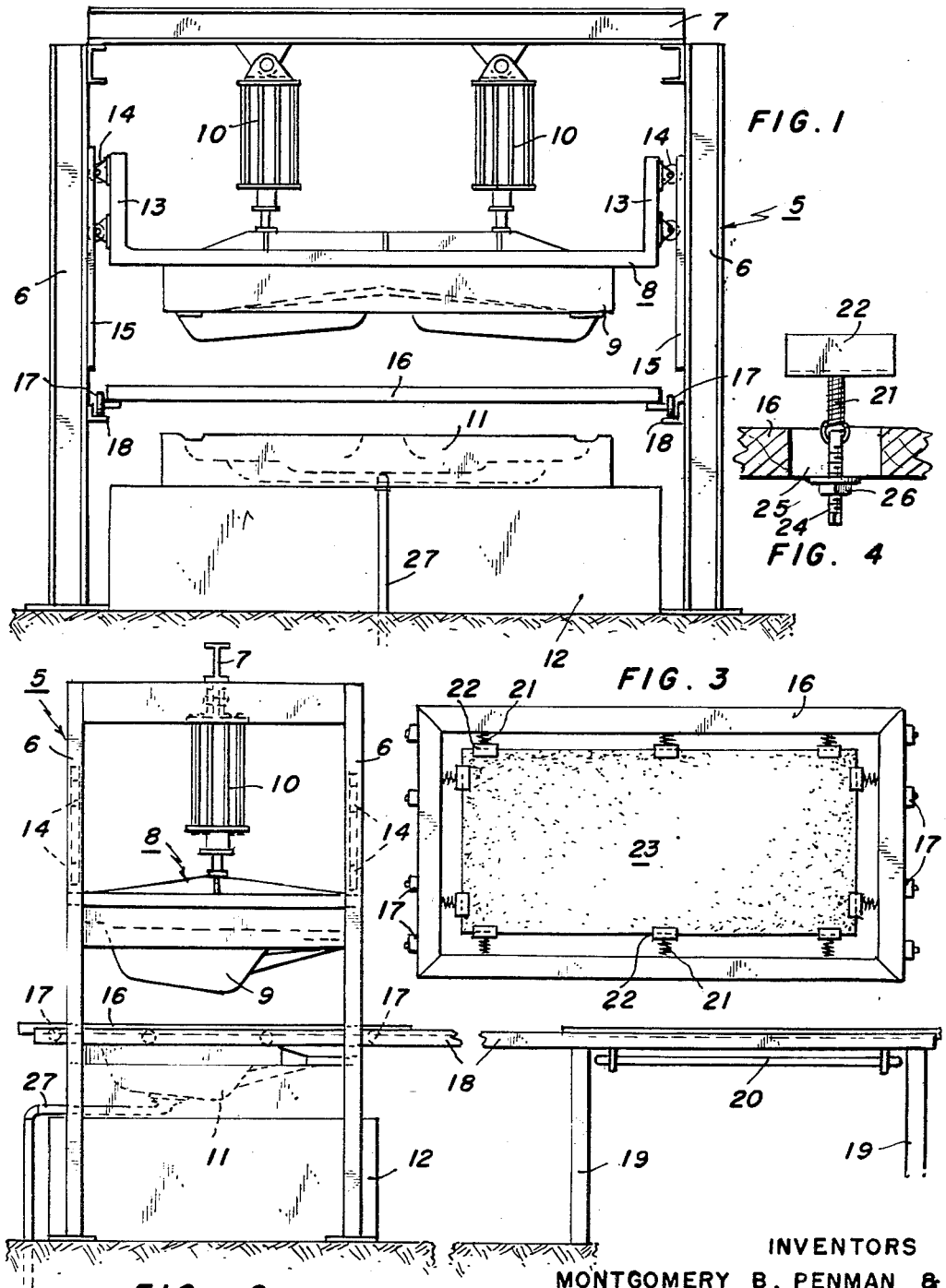

2,939,179

METHOD OF MOLDING A CARPET

Montgomery B. Penman and Harry M. Fry, Bloomsburg, Pa., assignors to The Magee Carpet Company, Bloomsburg, Pa., a corporation of Pennsylvania Filed June 21, 1957, Ser. No. 667,124

3 Claims. (Cl. 18—56)

This invention relates to a method of molding a carpet to a desired shape.

In the manufacture of carpet for the floors of motor vehicles it is desirable to shape the carpet to conform to irregularities in the floor, such as caused by the raised housing for the drive shaft. In order that the carpet will conform to the irregular contours of the floor it is desirable to first mold the carpet in the desired shape before laying the same.

According to the present invention the carpet is constructed with a thermoplastic coating on the backing which when subjected to heat may be molded to conform to the contour of the floor to which it is to be applied and upon cooling will retain its molded shape.

Briefly, the method comprises coating the back of the carpet with a thermoplastic material which upon setting becomes tough, elastic and relatively non-tacky. A piece of the carpet of the desired dimensions is suspended in a frame and held under constant tension to stretch the carpet in all directions. The carpet is then subjected to a temperature to cause the thermoplastic coating to become pliable and then while still under tension the carpet is placed in the mold forms and molded to the desired shape. While still in the mold forms the carpet is cooled to set the thermoplastic coating thus causing the carpet to retain its molded shape.

It is an object of the present invention to provide a novel method of molding carpet into desired shapes.

A further object of the invention resides in a method which includes the step of stretching and holding under constant tension a piece of carpet having a thermoplastic coating on the back while heating the coating sufficiently to cause it to become pliable and while molding the same to the desired shape.

Other objects and advantages of the invention will be apparent during the course of the following specification.

In the accompanying drawing forming a part of this specification and in which like numerals are employed to designate like parts throughout the same, Fig. 1 is a front elevation of the mold employed in the present method, Fig. 2 is a side elevation of the same, Fig. 3 is a plan view of the frame for holding the piece of carpet to be molded, and, Fig. 4 is a detail view of a modified form of adjustable clamp for holding the carpet in the frame.

In the drawing is disclosed a press for carrying out the method comprising a frame 5 having uprights 6 and a cross bar 7 from which is suspended a carrier frame 8 for the male mold member 9. The carrier frame is suspended from the cross bar by a pair of hydraulic pressure cylinders 10 which impart to the carrier frame a vertical movement towards and from the female mold member 11 supported by a base 12. The carrier frame 8 at each end has standards 13 supporting guide rollers 14 which move in tracks 15 attached to the uprights 6. A rectangular frame 16, more clearly shown in Fig. 3, has a series of rollers 17 mounted on each end to movably support the frame on angle bars 18 extending transversely of the frame 5 and attached to the uprights 6 in a plane intermediate the mold members 9 and 11. The angle bars extend beyond the frame 5 for a distance depending upon the number of frames 16 to be supported thereon in order to maintain the production requirements and are supported in a horizontal plane by legs 19. Arranged beneath a section of the angle bars 18 are heating pipes 20 connected to a suitable source of heat. Attached to the inner marginal edge of the frame 16 are a series of tension springs 21 arranged at spaced intervals having at their outer ends clamps 22 for gripping and holding the carpet 23 in stretched position. It may be desirable to adjustably mount the springs 21 in the frame by bolts 24 mounted in longitudinal slots 25 formed in the frame and held in adjusted position by nuts 26 threaded on the bolts, as shown in Fig. 4. The female mold member 11 is connected by a pipe 27 to a source of cool air or other cooling medium for setting the thermoplastic coating on the piece of carpet after it is molded into the desired shape.

The thermoplastic coating applied to the back of the carpet comprises an elastomer such a reclaimed rubber which is blended with a resin such as limed rosins having a melting point of 100–150° C. This blended mix is dispersed in an internal mixer of the Baker Perkins type. The dispersion is basically an emulsion of the blended solid materials in water. The resultant dispersion is further compounded by the addition of a water dispersion of a material such as china clay, aluminum silicates, ground limestone-barytes. The resultant film when the dispersion is dried is relatively stiff and non-tacky at room temperatures. It is highly thermoplastic and will become very tacky and flexible upon application of heat. Upon cooling, after heating, the material becomes tough, elastic and relatively non-tacky. Good results have been obtained by compounding the materials in the proportions of 100 parts of the elastomer to 50 to 150 parts of the resin and 50 to 250 parts of the water dispersion material.

After the thermoplastic coating is applied to the back of the carpet by conventional methods such as rollers, brushes or spraying it is dried in a conventional dryer and the carpet may be stored until it is desired to mold pieces of the carpet. Pieces of the carpet are cut to a size approximating the overall outside dimensions of the mold. The pieces of carpet are suspended in the frame 16 by the clamps 22 which are under constant tension of the springs 21 to stretch the piece of carpet while the carpet is carried through the process of molding. The frame carrying the carpet moves along the angle bars 18 and first passes over the heating pipes 20 where the thermoplastic coating is heated to a temperature of 220 to 300° F. or until the coating becomes soft and pliable. While the coating is in its heated condition the frame 16 is moved to position the carpet between the male and female mold members 9 and 11, whereupon the male member is moved downwardly by the hydraulic cylinders 10 forcing the carpet into the female member while the expansion and contraction of the spring clamps holds the carpet taut while it conforms to the shape of the mold. While the carpet is still in the mold cooling air is forced into the female mold chamber to facilitate setting of the thermoplastic coating while the carpet still conforms to the shape of the mold. When the molded carpet reaches room temperature it may be removed from the mold and will retain its molded shape. The molded carpet is then finished in the usual manner.

Having thus described our invention, we claim:

1. The method of molding a carpet having a fabric back to a desired shape which comprises applying a layer of thermoplastic material to the fabric back of the carpet, heating the layer of thermoplastic material until pliable, applying tension by elastic tensioning means to stretch the carpet in all directions while deforming the carpet under pressure and then cooling the thermoplastic material while still maintaining the carpet under tension.

2. The method of molding a carpet having a fabric back to a desired shape which comprises applying to the fabric back of the carpet a layer of thermoplastic material, heating the thermoplastic material until pliable, maintaining the carpet under continuous tension by elastic tensioning means to stretch the carpet in all directions while deforming the carpet under pressure and then cooling the thermoplastic material while the carpet is still under pressure and while maintaining said tension.

3. The method of molding a carpet having a fabric back to a desired shape which comprises applying to the fabric back of the carpet a layer of thermoplastic material, subjecting the layer of thermoplastic material to a temperature to cause the material to become pliable, applying tension by elastic tensioning means to stretch the carpet in all directions while the thermoplastic material is pliable, deforming the carpet to the desired shape while still under tension and then cooling the layer of thermoplastic material while still maintaining the carpet under tension to set the material and maintain the carpet in its deformed shape.

References Cited in the file of this patent

UNITED STATES PATENTS

| | | |
|---|---|---|
| 2,134,754 | Flint et al. | Nov. 1, 1938 |
| 2,234,839 | Edwards | Mar. 11, 1941 |
| 2,266,846 | Buff | Dec. 23, 1941 |
| 2,417,586 | Crosley | Mar. 18, 1947 |
| 2,500,598 | Axelrod | Mar. 14, 1950 |
| 2,700,179 | Benson | Jan. 25, 1955 |
| 2,759,217 | Peterson | Aug. 21, 1956 |

FOREIGN PATENTS

| | | |
|---|---|---|
| 470,331 | Great Britain | Aug. 3, 1937 |